United States Patent [19]

Ford

[11] Patent Number: 5,481,072
[45] Date of Patent: Jan. 2, 1996

[54] LOW PROFILE LOAD CELL FOR A WEIGHTING MACHINE

[75] Inventor: Michael W. Ford, West Midlands, England

[73] Assignee: GEC Avery Limited, England

[21] Appl. No.: 114,789

[22] Filed: Aug. 31, 1993

[30] Foreign Application Priority Data

Sep. 9, 1992 [GB] United Kingdom ............ 9219074

[51] Int. Cl.⁶ .................. G01G 3/14; G01G 3/08
[52] U.S. Cl. .................. 177/210 FP; 177/229; 73/862.59
[58] Field of Search .................. 177/229, 256, 177/260, 210 FP; 73/862.59

[56] References Cited

U.S. PATENT DOCUMENTS

| | | | |
|---|---|---|---|
| 4,274,501 | 6/1981 | Gallo et al. | 177/210 FP |
| 4,485,881 | 12/1984 | Tramposch et al. | 177/256 |
| 4,606,421 | 8/1986 | Schroeder | 177/256 |
| 4,679,642 | 7/1987 | Brock et al. | 177/256 |
| 4,697,658 | 10/1987 | Scheffer et al. | 177/256 |
| 4,732,228 | 3/1988 | Danhamer | 177/256 |
| 4,881,607 | 11/1989 | Backu | 177/256 |
| 5,088,334 | 2/1992 | Wirth | 177/229 X |
| 5,313,023 | 5/1994 | Johnson | 177/229 |

FOREIGN PATENT DOCUMENTS

| | | |
|---|---|---|
| 1576711 | 3/1977 | United Kingdom . |
| 1599735 | 10/1981 | United Kingdom . |
| 2190748 | 11/1987 | United Kingdom . |
| 2202953 | 10/1988 | United Kingdom . |

Primary Examiner—Peter S. Wong
Assistant Examiner—Randy W. Gibson
Attorney, Agent, or Firm—Kirschstein et al.

[57] ABSTRACT

A load cell, one end of the cell being mounted on a base and the other end of the cell being arranged for connection to a force applicator so that in operation applied loads are transmitted vertically to said other end to distort the cell, and wherein the cell houses a vibrating beam force sensor lying in a plane parallel to the base, the cell being so arranged that the vertical force produced by an applied load to the force applicator is translated into a horizontal force applied to the vibrating beam force sensor.

10 Claims, 1 Drawing Sheet

LOW PROFILE LOAD CELL FOR A WEIGHTING MACHINE

BACKGROUND OF THE INVENTION

1. Field of the Invention

The present invention concerns weighing machines and in particular those which use vibrating beam force sensors to sense the load on the load pan of the weighing machine.

2. Description of the Related Art

Vibrating beam force sensors are well known and essentially comprise a beam driven into flexural vibration by piezo electric transducers mounted at its ends. The vibrational frequency changes in response to changes in the tension of the beam and these changes are measured to provide a measurement of the applied tension. Such sensors are frequently used in conjunction with what is known as a Roberval mechanism. However the modern tendency is to make machines as compact as possible and the Roberval mechanism as currently used in weighing machines is too high to be used in modern low profile machines.

SUMMARY OF THE INVENTION

Accordingly the present invention has for an object the production of a low profile load cell utilising a vibrating beam force sensor.

In accordance with the present invention there is provided a load cell for a weighing machine, one end of the cell being mounted on a base and the other end of the cell being arranged for connection to a force applying means so that in operation applied loads are transmitted vertically to said other end to distort the cell, and wherein the cell houses a vibrating beam force sensor lying in a plane parallel to the base, the cell being so arranged that the vertical force produced by an applied load to the force applying means is translated into a horizontal force applied to the vibrating beam force sensor.

Preferably the load cell is machined from a single body of metal.

In accordance with a feature of the invention the vibrating beam force sensor is mounted in a cavity extending through the cell the end of the sensor lying nearest to said other end of the cell being fixed to a portion of the cell which is connected to said other end by means of a tension link which extends substantially vertically, said link lying between the fixed end of the sensor and the point at which load is applied to the cell. In accordance with a still further feature of the invention the portion of the cell connected to said other end by said tension link is connected to the mounted end of the cell via a pivot located beneath the sensor and between the fixed ends of the sensor. In a preferred embodiment the tension link and the pivot are both formed by an additional machined cavity extending through the cell.

BRIEF DESCRIPTION OF THE DRAWINGS

In order that the present invention may be more readily understood an embodiment thereof will now be described by way of example and with reference to the accompanying drawings in which.

DETAILED DESCRIPTION OF THE PREFERRED EMBODIMENTS

Figure 1:
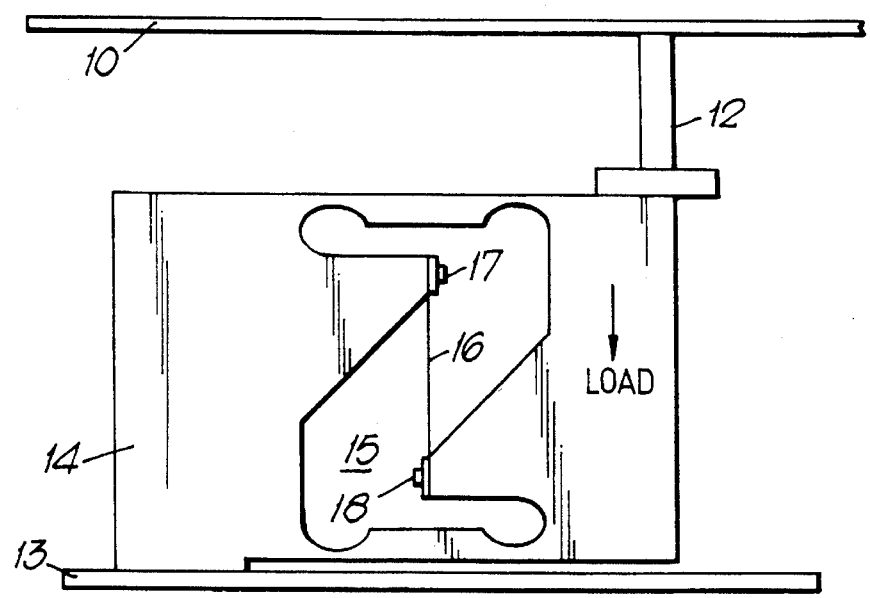
FIG. 1 is a diagrammatic side view of a weighing machine employing a known prior art Roberval mechanism.

Referring now to the drawings, FIG. 1 shows a traditional type weighing machine comprising a load pan 10 supported above a load cell 11 by a pan support 12, the load cell 11 being in the form of a Roberval mechanism. The cell 11 is made from a suitable metal and essentially comprises a hinged parallelogram. Thus the cell 11 is mounted on a base 13 at one side only, the mounting being indicated at 14. As can be seen the bulk of cell 11 projects cantilever fashion over the base plate 13. The pan support 12 is mounted on the side of the cell 11 remote from mounting 14.

The central area of cell 11 is cut away to leave a space 15 which in this embodiment resembles a crude representation of the letter Z. A three beam sensor 16 is mounted in this space by respective top and bottom sensor fixings 17 and 18 and is held under tension even when the cell 11 is unladen. When a load is placed on the weigh pan 10 the cell 11 flexes in response to the added weight and changes the tension in the force sensor 16. In the present embodiment the sensor 16 comprises a central beam surrounded by outer beams with all the beams being of equal width. The beams are manufactured from a single piece of metal which has flanges at each of its ends by means of which the sensor is mounted in the cell 11. In operation of the weighing machine the sensor 16 is driven into flexural vibrations with the outer beams vibrating in anti-phase to the central beam and these vibrations are detected. The frequency of the vibrations varies with the applied load so that a measurement of the load can be derived from the detected frequency.

The mechanism shown in FIG. 1 is too high to be used in modern low profile weighing machines.

Figure 2:
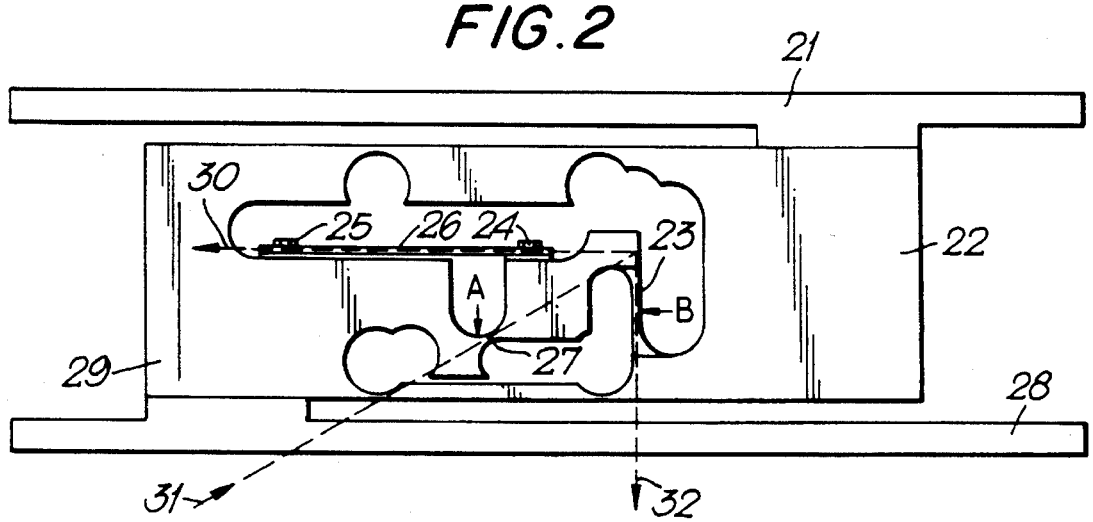
FIG. 2 is a similar view showing a load cell in accordance with the present invention.
Figure 3A:
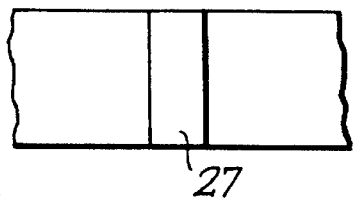
FIG. 3A and FIG. 3B are views taken in the directions of arrows A and B in FIG. 2.
Figure 3B:
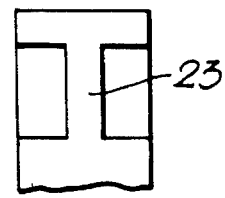

In order to meet this objection the present invention proposes replacing the known type of cell with its high profile Roberval mechanism as shown in FIG. 1 with the load cell shown in FIG. 2. In the embodiment of FIG. 2 the load pan is shown at 21 and this is connected to the end frame 22 of a low profile cell mounted to a baseplate 28 at 29. As can be seen this low profile cell also hangs cantilever-fashion over the baseplate 28 with the mounting 29 being remote from the end frame 22. In the FIG. 2 embodiment the force sensor is shown at 26 and its attachments to the cell are shown at 25 and 24. It will be appreciated that in the known FIG. 1 embodiment the applied load causes increased tension in the sensor 16 in a vertical direction. However in the embodiment of FIG. 2 when in operation a load is applied to load pan 21 and is transmitted into the end frame 22 the vertical component of this load is now carried by a tension link 23. The tension link 23 is reduced in width as shown in the FIG. 3B view in the direction B. The tension link 23 is narrow and in the centre of the cell, while the pivot 27 (see FIG. 3A) is wide in comparison. In response to this tension link at 23 the central mechanism of the cell then pivots about the link 27. The force so generated is then transmitted into the vibrating beam force sensor 26 via its clamping points 24 and 25, any unwanted horizontal forces are contained by the hinged parallelogram Roberval mechanism, the parallelogram taking the cornering forces.

It will be appreciated that during weighing operations any displacements in the load cell are very small. For example in the present embodiment the vibrating beam sensor 26 will only extend by 0.04 mm when the load is changed from zero to full load. From this it can be seen that the pivot 27 swings through only a very small angle.

It can be seen that when considering the generally horizontal plane extending between the mounting 29 of the cell and the frame end 22 which receives the load to be measured, that pivot 27 lies between the fixed ends of sensor 26 and tension link 23 lies between the end attached to the cell at 24 and the frame end 22.

The geometry of the load cell is arranged such that the pivot 27 is subjected purely to a compressive force. The forces on the central elements of the cell are shown by the lines 30, 31 and 32 in FIG. 2. This shows the vertical load in tension link 23 as force 32, the horizontal force in the vibrating beam 26 as force 30 and the compressive force in the pivot 27 as force 31.

Another advantage of the cell shown in FIG. 2 is that vibrating beam force sensors are sensitive to forces other than direct tension. If the vibrating beam force sensor is subject to torsion where one end rotates relative to the other its frequency of vibration will increase in a similar manner to the frequency increase produced by an increase in axial load. Previously, practical limitations of machining meant that it was impossible to build a one piece loading frame that would not transmit some torsion when the frame itself was subject to torsion.

The cell shown reduces the value of the transmitted torsion to a low value. The cell when subjected to torsion becomes stiffer, this tends to cancel the increase in output due to torsion.

What I claim is:

1. A low profile load cell in a machine for weighing a load exerting a load force in a vertical direction on a load support located above a base, said load cell comprising:

a) a one-piece body extending along a horizontal direction between one body end at which the body is cantilever mounted on the base, and another opposite body end at which the load support is mounted, said body being distortable during weighing along a diagonal direction inclined relative to the vertical and horizontal directions;

b) an elongated vibrating beam sensor having opposite sensor ends, and being driven into flexural vibrations during weighing; and c) means for mounting the sensor on the body in a horizontal plane extending along the horizontal direction to translate the vertically directed load force into a horizontal force applied to the sensor to cause said vibrations, said sensor ends being individually supported at spaced-apart points in said horizontal plane.

2. The load cell as claimed in claim 1, wherein the body has an internal cavity in which the sensor is mounted, and wherein one of the sensor ends is located adjacent said one body end, and wherein another of the sensor ends is located adjacent said other body end.

3. The load cell as claimed in claim 2, wherein the body has another internal cavity, said cavities bounding a tension link integral with the body and extending in the vertical direction.

4. The load cell as claimed in claim 3, wherein said cavities also bound a pivot link spaced from the tension link and also integral with the body.

5. The load cell as claimed in claim 4, wherein the pivot link has a predetermined cross-section, and wherein the tension link has a cross-section smaller than said predetermined cross-section.

6. The load cell as claimed in claim 4, wherein the pivot link extends along said diagonal direction.

7. The load cell as claimed in claim 4, wherein the pivot link is located below the sensor and intermediate said sensor ends.

8. The load cell as claimed in claim 3, wherein the tension link lies generally centrally within the body.

9. The load cell as claimed in claim 3, wherein the tension link is situated between said other sensor end and said other body end.

10. A machine for weighing a load exerting a load force in a vertical direction, comprising:

a) a base;

b) a load support located above the base;

c) a one-piece body extending along a horizontal direction between one body end at which the body is cantilever mounted on the base, and another opposite body end at which the load support is mounted, said body being distortable during weighing along a diagonal direction inclined relative to the vertical and horizontal directions;

d) an elongated vibrating beam sensor having opposite sensor ends, and being driven into flexural vibrations during weighing; and e) means for mounting the sensor on the body in a horizontal plane extending along the horizontal direction to translate the vertically directed load force into a horizontal force applied to the sensor to cause said vibrations, said sensor ends being individually supported at spaced-apart points in said horizontal plane.

\* \* \* \* \*